US012388223B2

(12) United States Patent
Tang

(10) Patent No.: US 12,388,223 B2
(45) Date of Patent: Aug. 12, 2025

(54) HIGH FREQUENCY UNINTERRUPTIBLE SIGNAL AND POWER BYPASS WITH ROCKER MECHANISM

(71) Applicant: Antronix Inc., Cranbury, NJ (US)

(72) Inventor: Neil H. Tang, Princeton, NJ (US)

(73) Assignee: Antronix Inc., Cranbury, NJ (US)

( * ) Notice: Subject to any disclaimer, the term of this patent is extended or adjusted under 35 U.S.C. 154(b) by 343 days.

(21) Appl. No.: 18/188,893

(22) Filed: Mar. 23, 2023

(65) Prior Publication Data

US 2023/0307878 A1 Sep. 28, 2023

Related U.S. Application Data

(60) Provisional application No. 63/324,329, filed on Mar. 28, 2022.

(51) Int. Cl.

*H01R 24/46* (2011.01)
*H01R 9/05* (2006.01)
*H01R 13/70* (2006.01)

(52) U.S. Cl.

CPC ........... *H01R 24/46* (2013.01); *H01R 9/0506* (2013.01); *H01R 13/701* (2013.01)

(58) Field of Classification Search

None

See application file for complete search history.

(56) References Cited

U.S. PATENT DOCUMENTS

| | | | | | |
|---|---|---|---|---|---|
| 3,881,160 | A * | 4/1975 | Ross | H03H 7/482 333/127 |
| 5,648,745 | A * | 7/1997 | Spriester | H01R 24/52 439/189 |
| 5,677,578 | A * | 10/1997 | Tang | H01R 13/701 307/119 |
| 5,756,935 | A * | 5/1998 | Balanovsky | H01R 24/547 200/51.09 |
| 5,814,905 | A * | 9/1998 | Tang | H04N 7/104 307/119 |
| 5,850,165 | A * | 12/1998 | Spriester | H01R 24/52 333/100 |
| 5,909,154 | A * | 6/1999 | Brown | H04N 7/104 333/100 |
| 5,914,863 | A * | 6/1999 | Shen | H01R 24/46 361/752 |
| 6,593,830 | B2 * | 7/2003 | Wu | H01R 24/46 725/127 |
| 7,807,935 | B2 * | 10/2010 | Tang | H01R 24/46 333/100 |
| 9,661,263 | B2 * | 5/2017 | Chang | H04N 7/104 |
| 11,437,694 | B2 * | 9/2022 | Holland | H01P 3/06 |
| 11,545,799 | B2 * | 1/2023 | Lee | H01R 13/646 |
| 11,611,181 | B2 * | 3/2023 | Holland | H01R 33/945 |
| 12,255,425 | B2 * | 3/2025 | Holland | H01R 12/7076 |
| 2016/0113140 | A1 * | 4/2016 | Chang | H04N 7/104 361/679.01 |

* cited by examiner

*Primary Examiner* — Ross N Gushi
(74) *Attorney, Agent, or Firm* — Volpe Koenig

(57) ABSTRACT

A multi-tap distribution box for connection to a main coaxial line carrying high frequency and alternating current power signals, the multi-tap distribution box comprising a make before break jumper that ensures that connection between first and second main line coaxial connectors in the box is not interrupted when a cover of the box is removed.

10 Claims, 7 Drawing Sheets

HIGH FREQUENCY UNINTERRUPTIBLE SIGNAL AND POWER BYPASS WITH ROCKER MECHANISM

CROSS REFERENCES

This U.S. Non-Provisional Patent application claims priority of U.S. Provisional Patent Application No. 63/324,329, filed on Mar. 28, 2022, the entire contents of which are hereby incorporated by reference.

TECHNICAL FIELD

This disclosure generally relates to high frequency coaxial cable interconnection devices.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In cable TV and other radio frequency (RF) distribution systems it is typically necessary to tap off of a RF signal from a main distribution cable to connect a video, data, telephony or RF signal into a customer's facility or other devices on a secondary cable. The signal that is tapped off of the main distribution cable is generally substantially attenuated through use of a signal tapping device.

A known device for accomplishing this is a multi-tap, that permits connection to a main RF signal carrying cable, and provides multiple outputs for individual connection to a plurality of additional devices or service to customers. In a typical cable television distribution system, for example, a plurality of multi-tap devices are connected as required along the length of a main signal line for tapping and distributing RF signals to a plurality of the customers located in a vicinity of the areas through which the main cable extends. In such an installation, it is common practice to pass the main cable into one multi-tap at an input port thereof, and to continue the main cable from an output port of the multi-tap for connection to the input port of the next multi-tap down line. It is also typical to have the main distribution cable conduct both the RF signal along with the AC power necessary to power electronic equipment in the cable distribution system, such as optical nodes, RF amplifiers, and cellular/WiFi access points. It is often necessary to open one or more of the multi-taps connected in cascade in order to change a tap plate for changing the attenuation or changing the filtering within the multi-tap to optimize the RF signal, such as when compensating for cable loss and/or cable tilt, in order to maintain the customer's signal level at an appropriate level of power.

With known multi-taps of the prior art, whenever tap plates must be removed for substituting a new tap plate to obtain a different attenuation, or to repair a particular multi-tap, or to change the filtering within the multi-tap to optimize the RF signal characteristics, the main RF signal and AC power have an uninterruptible RF signal and AC power bypass installed in the multi-tap to keep all customers active while the multi-tap is opened.

To open a multi-tap, the faceplate is typically removed from the housing by loosening the faceplate closure bolts or screws. The faceplate is then pulled away from the housing by pulling on the faceplate. As the faceplate is removed from the housing, the faceplate is often not removed evenly and perpendicular to the housing, which may cause the switching mechanism used to maintain uninterrupted RF signal and AC power to not function properly. This may cause an interruption in RF signal and AC power downstream to the multi-tap and may affect customer service, especially as more active electronics are installed in the distribution system. The temporary loss of signal or power and may cause distribution system or customer electronics to suffer AC power loss and even reboot electronic devices causing an extended customer service interruption.

DETAILED DESCRIPTION

According to the techniques of this disclosure, there is described herein a multi-tap enclosure with a robust mechanism for ensuring that a connection is maintained between two main line connectors when the face plate is removed regardless of the angle at which the face plate is removed with respect to the multi-tap enclosure.

Figure 1:
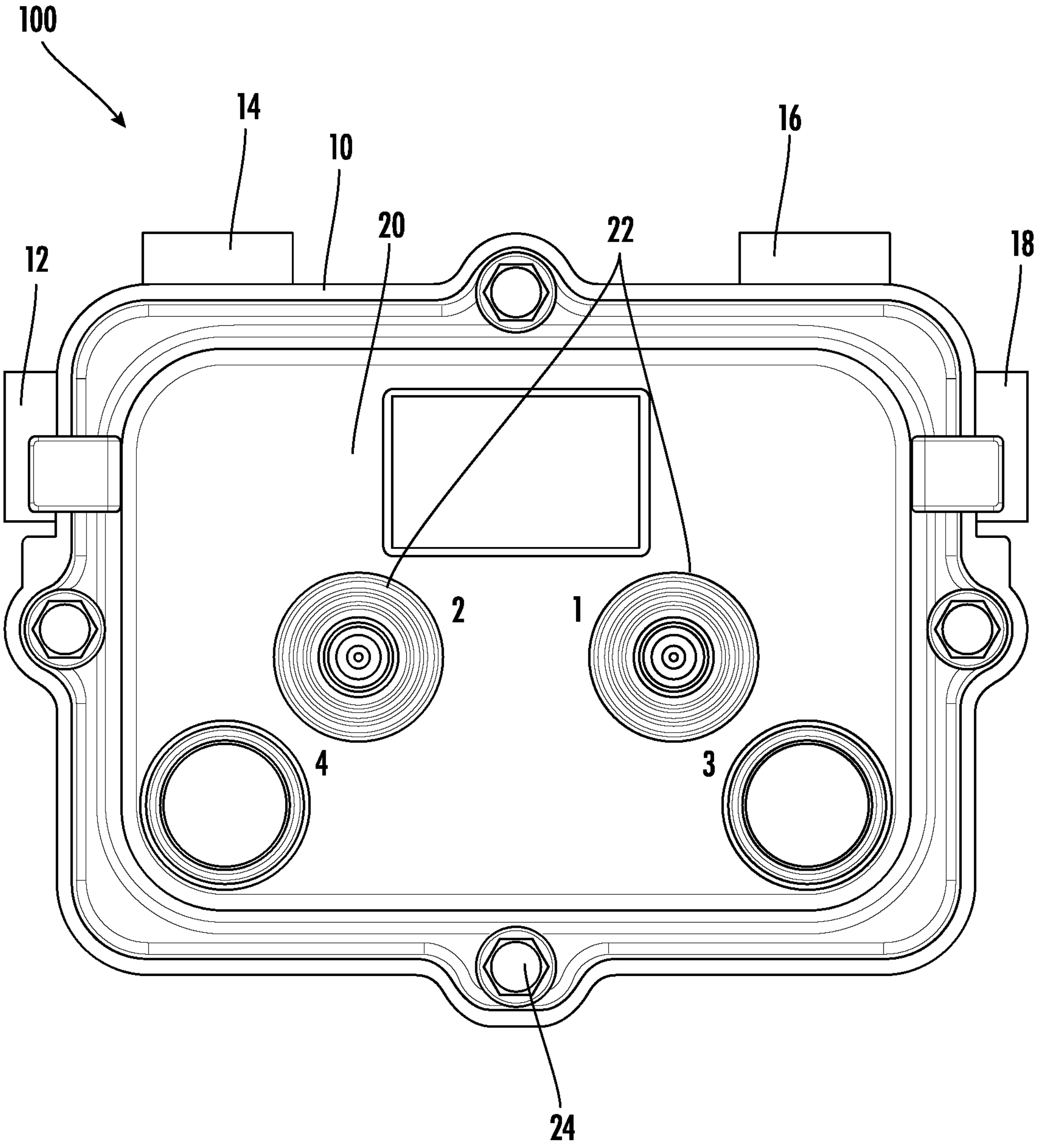
FIG. 1 is a drawing of a multi-tap coaxial cable junction box according to an aspect of the invention.

FIG. 1 shows an example multi-tap device 100 according to an aspect of the invention. The multi-tap 100 includes a housing 10 and a cover plate 20. The housing 10 includes threaded ports 12, 14, 16 and 18 that are arranged to accept standard 5/8-24 male coaxial connectors for a main cable (not shown). In a typical above ground installation, the main cable is connected to ports 12 and 18. In an underground installation where the cables rise vertically up to the multi-tap 100, ports 14 and 16 are used. The cover plate 20 is arranged to potentially accommodate up to eight ports to customer cable line connectors, however, in this example, only two ports 22 are shown. The cover plate is labeled in this view with four port spaces 1, 2, 3, and 4. The cover plate 20 is typically fastened to the housing 10 with bolts or screws, 24.

Figure 2:
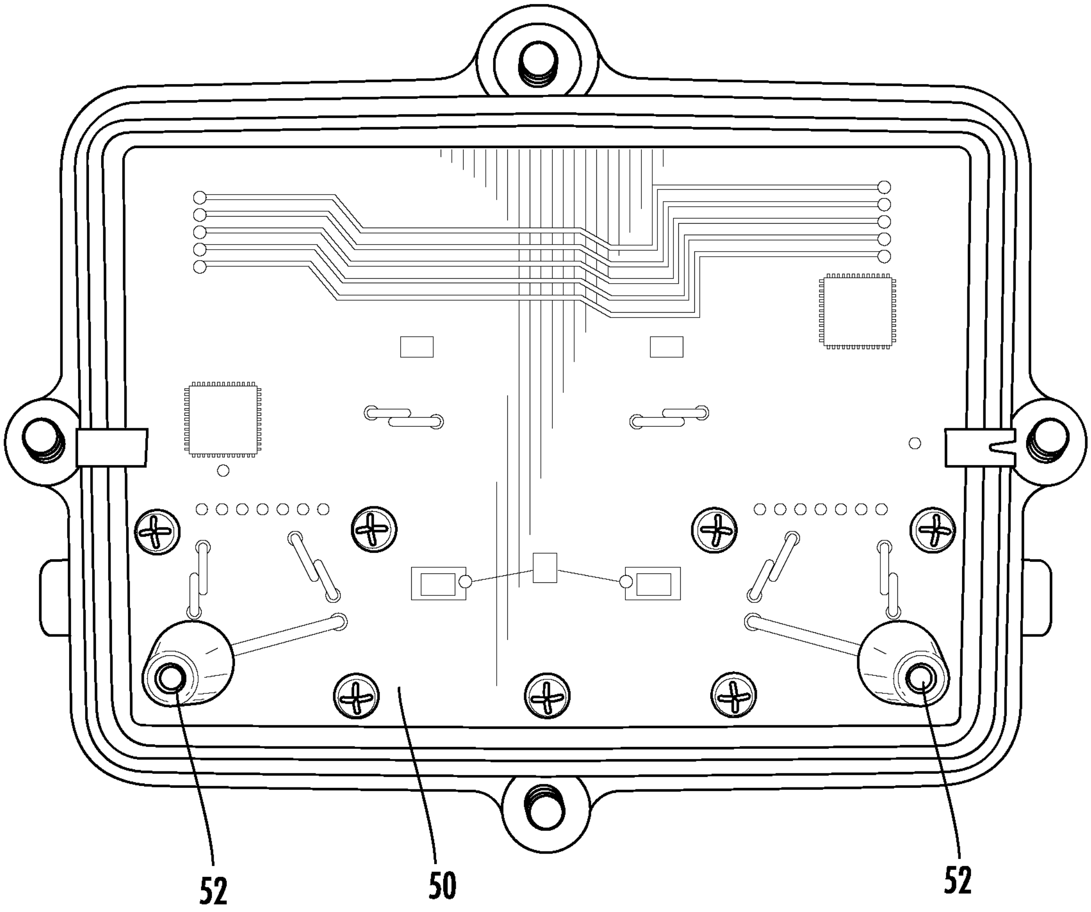
FIG. 2 is a drawing of a printed circuit board located inside the cover of the multi-tap coaxial cable junction box of FIG. 1.

FIG. 2 shows an example printed circuit board 50 on the inside of a multi-tap cover plate 20. The back side of the printed circuit board 50 faces the outside of the cover plate 20 and customer cable connectors on the cover plate connect to the printed circuit board from the back side of the board. The printed circuit board has two sockets 52 to accept pin connectors 42 that are mounted in the housing 10. When the cover plate 20 is installed on the housing 10, the two sockets 52 connect to the pin connectors 42, which, in turn connect to the main line cable ports (12, 14, 16, 18). As described above, the multi-tap must provide for the pin connectors 42 to be electrically connected to each other when the cover plate 20 is removed. An exemplary jumper mechanism according to an aspect of the invention that electrically connects the two pin connectors 42 together when the cover plate 20 is removed will now be described.

Figure 3:
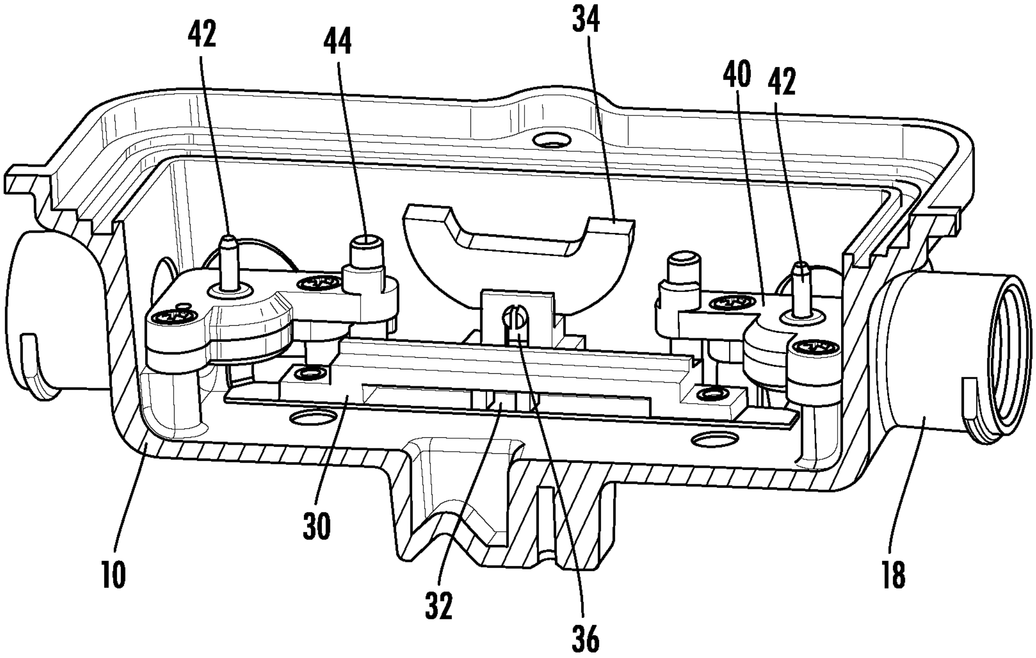
FIG. 3 is a cut-away drawing of an exemplary make-before-break jumper mechanism installed in a housing of a multi-tap coaxial junction box according to an aspect of the invention.
Figure 4:
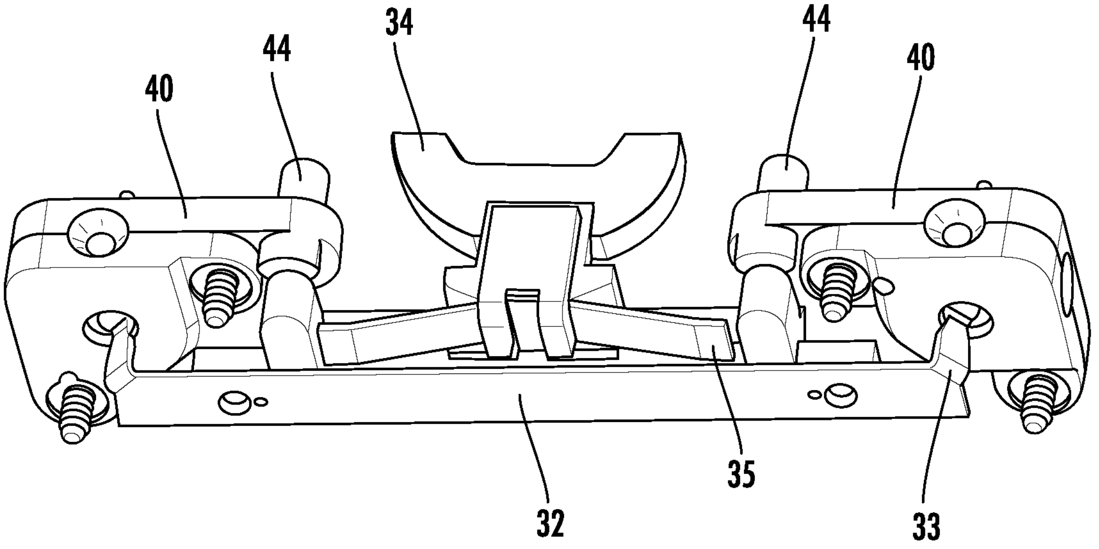
FIG. 4 is a detailed drawing of an exemplary make-before-break jumper mechanism according to an aspect of the invention.

FIG. 3 is a cut-away view of a multi-tap housing that shows an exemplary jumper mechanism according to an aspect of the invention that electrically connects two pin connectors 42 when a cover plate 20 of a multi-tap is removed. Some of components described with respect to FIG. 3 may also be seen in different views FIGS. 4 and 5.

A jumper conductor 32 extends lengthwise across the bottom of the housing 10. The jumper conductor 32 is attached to a cross bar 30, which is in turn attached to a rocker 34 via a pivot pin 36. When the cover plate 20 (not shown in FIG. 3) is installed on top of the housing 10, the printed circuit board 50 presses down on the rocker 34, which pushes the cross bar 30 and the jumper conductor 32 down towards the bottom of the housing 10. A spring 35 (shown in FIGS. 4 and 5) presses against the bottom of the housing 10 and forces the cross bar 30 and jumper conductor 32 up away from the housing bottom when the cover plate 20 is removed. Two upward facing tabs 33 of the jumper 32 are configured to contact the bottom of the pin connectors 42 when the cover plate 20 is removed and the cross bar 30 is forced upward by the spring 35, thus electrically connecting the two pin connectors 42 and thereby connecting the two main line cables that are connected to the pin connectors 42.

The cross bar 30 includes two alignment pins 44 that slide vertically in openings in corresponding pin connector housings 40 and keep the cross bar 30 horizontally aligned and thus ensure that the jumper 32 moves parallel to the base of the housing 20 and that the two tabs 33 of the jumper move upwards together when the housing cover 20 is removed.

Rocker 34 is designed to remain in contact with and tilt with the cover plate 20 in the case where the cover plate 20 is not removed directly upwards such that it remains parallel to the housing. Regardless of the angle at which the cover plate 20 is removed from the housing 10, the rocker 34 remains in contact with the printed circuit board 50 that is mounted to the cover plate 20 and gradually the rocker 34 is urged upwards by the spring 35 as the cover plate is removed. Again, the two pins 44 that are part of the cross bar 30 keep the cross bar and the jumper conductor 32 parallel to the base of the housing 10.

Figure 5:
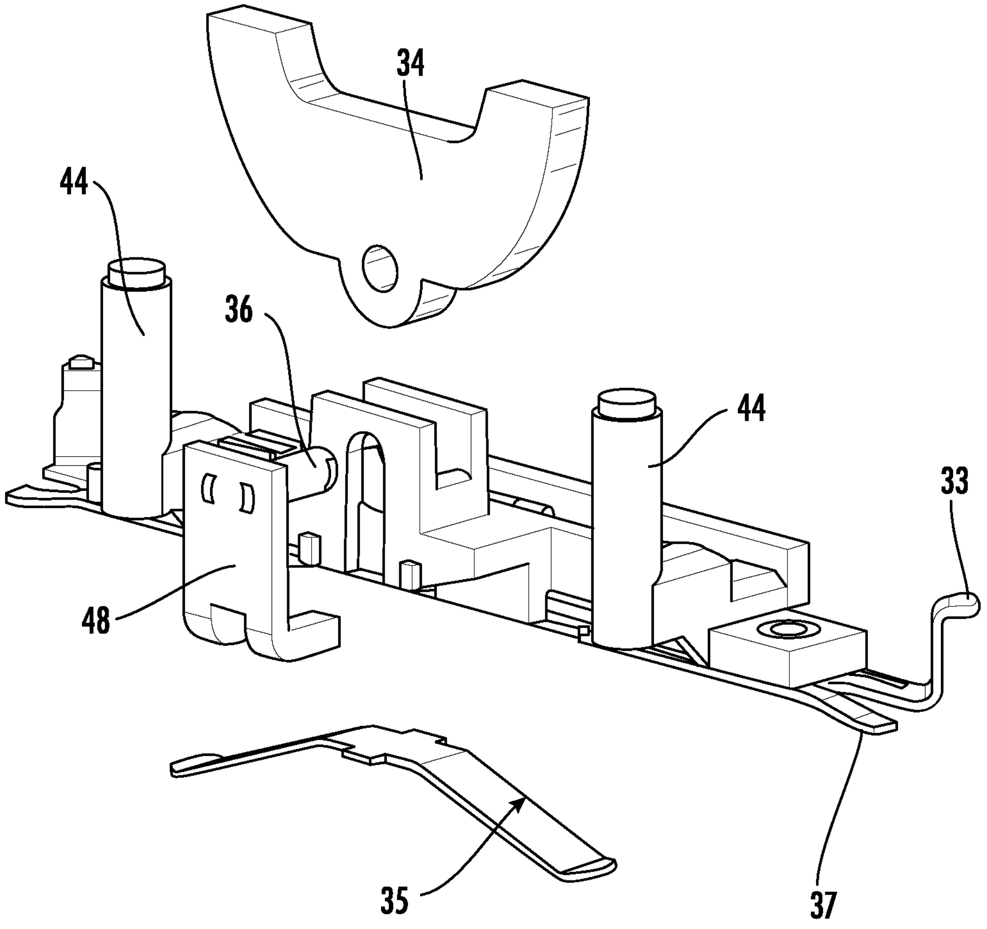
FIG. 5 is an exploded diagram of components of the mechanism of FIGS. 3 and 4.

FIG. 5 shows an example jumper conductor 32 according to an aspect of the invention, wherein the jumper conductor has two downward sloping tabs 37. The downward sloping tabs are designed to provide positive contact to the inside base of the housing 10 when the housing cover 20 is in place. It is important to keep the jumper conductor 32 shorted to the housing cover 20 when the housing cover 20 is closed because the jumper conductor 32 may resonate at signal frequencies present in the multi-tap if it is not grounded to the housing. The downward sloping tabs 37 provide a reliable connection to housing base. In other aspects of the invention, the housing base may have raised surfaces that contact the jumper conductor 32 to robustly ground the jumper conductor when the housing cover 20 is installed. FIG. 5 also shows an example support 48 for the pivot pin 36.

Figure 6:
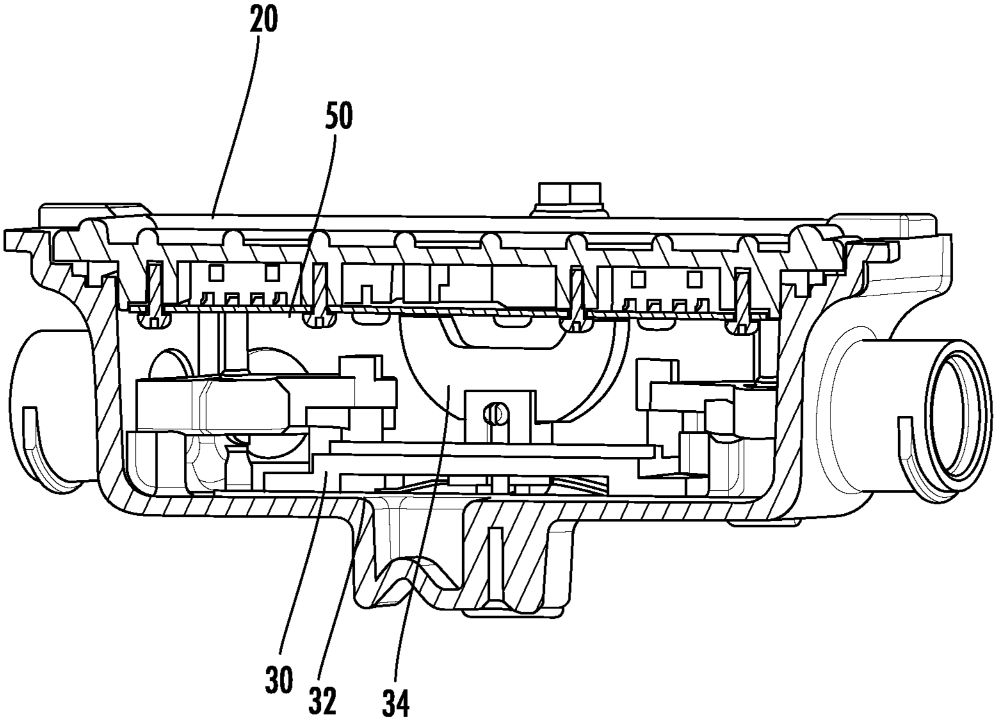
FIG. 6 is a cut-away drawing of an exemplary make-before-break jumper mechanism installed in a housing of a multi-tap coaxial junction box according to an aspect of the invention with the cover of the multi-tap coaxial junction box installed.

FIG. 6 is a cross section view of the multi-tap 100 with the cover 20 installed. As shown in this view, the printed circuit board 50 presses down on the rocker 34, forcing the cross bar 30 and the jumper 32 towards the base of the housing 10. With the cover 20 installed, the two sockets 52 on the printed circuit board (shown FIG. 2) are connected to respective two pin connectors 42 located in the housing base (shown FIG. 3). To ensure that a connection is always maintained between the two pin connectors 42 (either via the printed circuit board 50 or the jumper 32), it is necessary that the jumper short the bases of the two pin connectors 42 well before the sockets 52 on the printed circuit board 50 are free of the pin connectors 42. The connection of the two pin connectors 42 by the jumper 32 is "make-before-break."

Figure 7:
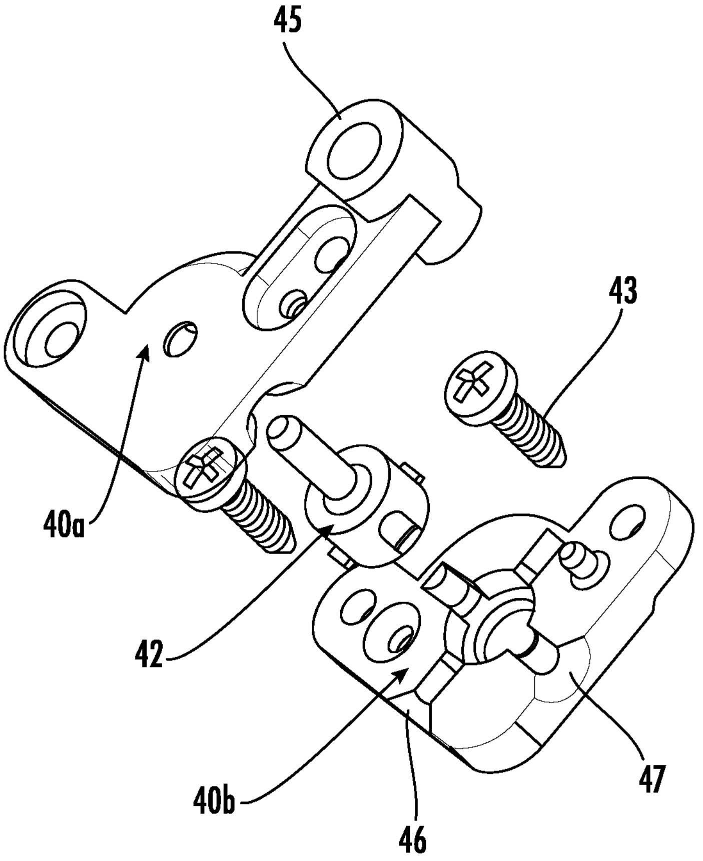
FIG. 7 is an exploded diagram of components of a pin connector housing according to an aspect of the invention.

FIG. 7 shows an exploded view of an exemplary pin connector housing 40. The housing comprises top and bottom sections 40*a*, 40*b*, respectively. The pin connector housing shown fits into the multi-tap housing in the right side of the view as shown in FIG. 3 and is held in place by two screws 43. Pin sleeve 45 accepts one of the alignment pins 44 that keep the jumper bar aligned parallel to the base of the multi-tap housing 10 when the cover 20 is being removed. The two slots 46, 47 on the sides of bottom section 40*b*, together with corresponding slots (unlabeled) on the top section 40*a*, form openings in the assembled pin connector housing 40 to accept coaxial connector pins from either the side port 18 or top port 16. A coaxial connector pin fits into and is held captive by the pin connector 42. In the embodiment shown, the pin connector 42 is a novel pin connector that is disclosed in a contemporaneously-filed provisional application by the applicant of this present application titled. The pin connector 42 may also be a conventional pin connector that employs a set screw in the base to lock in a coaxial connector pin.

It should be noted that the rocker 34 presses against the multi-tap faceplate printed circuit board 50. Therefore, the printed circuit board must be sufficiently stiff so as not to flex when pressure is applied by the rocker. This may be achieved by selection of printed circuit board material, board thickness, or mounting supports or pads beneath the printed circuit board, or any combination of the above measures. The criterion that the board not flex, not only is important to maintain the integrity of the board and the circuitry and components and solder joints on the board, but also to ensure that the travel distance of the rocker when the cover 20 is closed is consistent to ensure that the jumper 32 makes complete contact with the base of the housing and is fully disconnected from the pin connectors 42.

The jumper 32 must support current of 15 to 20 amperes of AC power and high frequency signals. The dimensions of jumper 32 must be designed so that the proper 750 impedance is maintained. Typical AC power is 60 VAC or 90 VAC at up to 20 amperes. The jumper material must therefore must be selected to avoid corrosion and plastic materials in the device must be able to support the temperatures associated with the industrial temperature range and the high current going through the device without deforming.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term or as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by +0.5%, +1%, +2%, ±3%, +4%, +5%, +10%, +12%, or +15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that Bis a factor that affects the determination of A. In some instances, other factors may also contribute to the determination of A. In other instances, A may be determined based solely on B.

The invention claimed is:

1. A multi-tap distribution box for connection to a main coaxial line carrying high frequency and alternating current power signals, the multi-tap distribution box comprising:

a housing comprising a housing base and a cover, the housing base comprising first and second main-line coaxial cable ports, the cover comprising first and second single conductor cover connectors arranged to connect to first and second housing base single conductor connectors, the first and second housing base single conductor connectors connected to the first and second main-line coaxial cable ports, respectively, such that when the cover is installed on the housing base, the first and second main line coaxial able ports are electrically connected together, the housing further comprising a jumper conductor arranged to electrically connect the first and second main-line coaxial cable ports together when the cover is removed, such that a jumper conductor connection is made between the first and second main-line coaxial cable ports prior to either of the first or second housing base single conductor connecters disengaging from their respective first or second single conductor cover connectors, the jumper conductor being supported by a spring-loaded support bar, the spring-loaded support bar being connected by a pivot to a push bar, push bar being adapted to contact the cover or a component attached to the cover, such that when the cover is removed from the housing a jumper conductor connection is made by the jumper conductor between the first and second main-line coaxial cable ports prior to either of the first or second housing base single conductor connecters disengaging from their respective first or second single conductor cover connectors.

2. The multi-tap distribution box of claim 1, wherein the component attached to the cover comprises a printed circuit board.

3. The multi-tap distribution box of claim 2, wherein the push bar is u-shaped and contacts the printed circuit board in at least two locations.

4. The multi-tap distribution box of claim 2, wherein the printed circuit board comprises at least one connection to a third coaxial connector mounted in the cover.

5. The multi-tap distribution box of claim 4, wherein the printed circuit board further comprises at least one passive component electrically connected to at least one of the first and second single conductor cover connectors or the third coaxial connector.

6. The multi-tap distribution box of claim 1, wherein the jumper conductor is further configured to electrically connect to the housing base when the cover is closed.

7. The multi-tap distribution box of claim 1, wherein the housing base comprises a housing base bottom surface and wherein the spring-loaded support bar is restrained from tilting with respect to the housing base bottom surface.

8. The multi-tab distribution box of claim 7, wherein the restraint from tilting comprises first and second alignment pins attached to the spring-loaded support bar, the first and second alignment pins arranged perpendicular to the housing box base bottom and further arranged to move through respective first and second pin sleeves when the cover is opened or closed.

9. The multi-tap distribution box of claim 1, wherein the housing base is rectangular, comprising third and fourth main-line coaxial cable ports, electrically connected to the first and second main-line, respectively, the first and second main-line coaxial cable ports arranged at opposite sides of the housing base and the third and fourth main-line coaxial cable ports arranged in a same side of the housing base, which is adjacent to the opposite sides.

10. The multi-tap distribution box of claim 1, wherein the housing base is square, comprising third and fourth main-line coaxial cable ports, electrically connected to the first and second main-line, respectively, the first and second main-line coaxial cable ports arranged at opposite sides of the housing base and the third and fourth main-line coaxial cable ports arranged in a same side of the housing base, which is adjacent to the opposite sides.

* * * * *